UNITED STATES PATENT OFFICE.

EDMUND K. MUSPRATT, OF SEAFORTH HALL, NEAR LIVERPOOL, COUNTY OF LANCASTER, AND GEORG ESCHELLMANN, OF NORTHWICH, COUNTY OF CHESTER, ENGLAND.

MANUFACTURE OF SODIUM-CHLORATE.

SPECIFICATION forming part of Letters Patent No. 388,217, dated August 21, 1888.

Application filed April 17, 1888. Serial No. 270,933. (No specimens.) Patented in England October 31, 1883, No. 5,183; in Germany November 6, 1883, No. 27,729; in Belgium November 12, 1883, No. 63,186; in France November 12, 1883, No. 158,508, and in Austria-Hungary January 6, 1884, No. 43,022 and No. 57,676.

*To all whom it may concern:*

Be it known that we, EDMUND KNOWLES MUSPRATT, a subject of the Queen of Great Britain and Ireland, and GEORG ESCHELLMANN, Ph. D., a subject of the Emperor of Germany, and residing, respectively, at Seaforth Hall, near Liverpool, in the county of Lancaster, and Northwich, in the county of Chester, both in the Kingdom of England, have invented certain Improvements in the Manufacture of Chlorate of Soda, (for which we have obtained patents in Great Britain, No. 5,183, dated October 3, 1883; in Germany, No. 27,729, dated November 6, 1883; in Belgium, No. 63,186$^B$, dated November 12, 1883; in France, No. 158,508, dated November 12, 1883; in Austria-Hungary, No. 57,676—Hungary, dated January 6, 1884, No. 43,022, and Austria, dated January 6, 1884,) of which the following is a specification.

Chlorate of soda is at present manufactured from chlorate of potash, or by the methods described in the specifications of the English patents granted to Mr. Walter Weldon, dated February 1, 1881, and numbered 424 and 425.

Our invention relates to the production of chlorate of soda; and it consists in the employment of magnesia in conjunction with chlorine, (in a manner similar to that now adopted in the production of chlorate of lime,) so as to obtain chlorate of magnesia and chloride of magnesium. The products thus resulting are then treated with either caustic soda or with carbonate of soda, or with mixtures of the same, so as to produce corresponding compounds of soda—viz., chlorate of soda and chloride of sodium; and, also, either magnesia or carbonate of magnesia or mixtures of the same.

In carrying our invention into effect the magnesia is mixed with water and is kept in suspension therein by agitation, and is treated with chlorine gas after the manner practiced when milk of lime is employed for the production of chlorate of lime. The product of this treatment of magnesia with chlorine is a liquor containing magnesium-chlorate and magnesium-chloride in the proportion of from about five to five and a half equivalents of the latter to one of the former. This magnesian liquor may be at once subjected to the treatment hereinafter described, or the said magnesian liquor may be boiled down to about from 75° to 80° Twaddle, and magnesium-chloride crystallized out by cooling, leaving behind a liquor containing one equivalent of magnesium-chlorate to about four equivalents of magnesium-chloride. The original or the improved magnesian liquor is then treated with either caustic soda or with carbonate of soda, or with a mixture of the same, so as to decompose the salts of magnesia and of magnesium either into magnesia or carbonate of magnesia, or mixtures of the same, and so as to yield a solution of chlorate of soda and of chloride of sodium. The magnesia or magnesium-carbonate, or mixtures of the same, is or are allowed to settle and the clear liquor is decanted off for further treatment. The magnesia thus obtained, after having been washed, may be again employed for the absorption of chlorine. and the carbonate of magnesia or mixtures of magnesia and carbonate of magnesia, after having been washed and calcined, may be again employed for the absorption of chlorine. The decanted sodium liquor is then to be boiled down to about from 95° to 100° Twaddle, by which treatment the sodium-chloride falls out as crystals, which may be separated from the liquor in any known way. The remaining liquor is then allowed to cool, and sodium chlorate is crystallized therefrom.

Having now described and particularly ascertained the nature of our said invention, and the manner in which the same is or may be used or carried into effect, we would observe, in conclusion, that we do not confine ourselves to the exact proportions and densities above set forth, as they may be varied according to circumstances and conditions; but

What we consider to be novel and original, and therefore claim as the invention secured to us by the hereinbefore in part recited Letters Patent, is—

1. The process of manufacturing chlorate of soda by treating magnesia mixed with water with chlorine, and subsequently effecting the decomposition of the resulting magnesian liquor by means of caustic soda or carbonate of soda, or mixtures of the same, substantially as described.

2. The process of manufacturing chlorate of soda by treating magnesia mixed with water with chlorine, then boiling down the resulting magnesian liquor to crystallize out magnesium-chloride, and then decomposing the liquor by means of caustic soda or carbonate of soda, or mixtures of the same, substantially as described.

In testimony whereof we have signed our names to this specification in the presence of two subscribing witnesses.

E. K. MUSPRATT.
GEORG ESCHELLMANN.

Witnesses:
W. J. SULIS,
   *U. S. Vice-Consul.*
J. B. EMMONS,
   *U. S. Consulate, Liverpool.*